(12) United States Patent
Hymel et al.

(10) Patent No.: US 8,606,300 B2
(45) Date of Patent: Dec. 10, 2013

(54) EFFICIENCY OF ELECTRONIC MESSAGE COMMUNICATIONS BETWEEN MOBILE COMMUNICATION DEVICES

(75) Inventors: James Allen Hymel, Kitchener (CA); Thomas Edward Byrd, Wokingham (GB); William Alexander Paton, Simcoe (CA); Edvard Kikic, Kitchener (CA); Jean Philippe Bouchard, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/354,091

(22) Filed: Jan. 19, 2012

(65) Prior Publication Data

US 2013/0190015 A1 Jul. 25, 2013

(51) Int. Cl.
*H04W 24/00* (2009.01)
(52) U.S. Cl.
USPC .................. 455/456.3; 455/404.2; 455/412.1; 455/412.2; 455/414.1
(58) Field of Classification Search
USPC ...................... 455/404.2, 412.1–412.2, 414.1, 455/456.1–456.6, 457, 459, 466, 41.2, 518, 455/519
See application file for complete search history.

(56) References Cited

U.S. PATENT DOCUMENTS

| | | | |
|---|---|---|---|
| 7,212,827 B1 * | 5/2007 | Veschl | 455/456.1 |
| 7,418,268 B1 | 8/2008 | Cabano et al. | |
| 7,765,265 B1 | 7/2010 | Granito et al. | |
| 2007/0250707 A1 | 10/2007 | Noguchi | |
| 2007/0265033 A1 | 11/2007 | Brostrom | |
| 2008/0146157 A1 | 6/2008 | Aaron | |
| 2008/0177758 A1 | 7/2008 | Eldering | |
| 2009/0030999 A1 | 1/2009 | Gatzke et al. | |
| 2009/0192872 A1 | 7/2009 | Moritz et al. | |
| 2009/0248437 A1 | 10/2009 | Gucciardi et al. | |
| 2009/0300010 A1 | 12/2009 | Ratnakar | |
| 2010/0280904 A1 | 11/2010 | Ahuja | |
| 2011/0196868 A1 | 8/2011 | Hans et al. | |
| 2012/0173632 A1 * | 7/2012 | Chakra et al. | 709/206 |

FOREIGN PATENT DOCUMENTS

| | | |
|---|---|---|
| EP | 1691565 A1 | 8/2006 |
| EP | 1802145 A1 | 6/2007 |
| EP | 2180665 A1 | 4/2010 |
| WO | 0184867 A1 | 11/2001 |
| WO | 2006010977 A1 | 2/2006 |
| WO | 2007008761 A1 | 1/2007 |

OTHER PUBLICATIONS

Extended European Search report mailed May 22, 2012, in corresponding European patent application No. 12151824.5.

(Continued)

*Primary Examiner* — Wayne Cai
(74) *Attorney, Agent, or Firm* — Novak Druce Connolly Bove + Quigg LLP

(57) ABSTRACT

A disclosure provides mobile communication devices that receive information corresponding to users associated with target mobile communication device, via a near field communication protocol. The information is stored in a storage device either within the mobile communication device or within a separate server. If it is determined that the target mobile communication device is within a predetermined distance of the mobile communication device, data entries associated with the stored information are created and retrieved, in real time. The data entries are displayed on the mobile communication device. The data entries may include personal information or email messages from prior communication sessions, which are employed in future communications between the mobile communication devices.

20 Claims, 5 Drawing Sheets

| | 502 Mobile Device 0001 | 504 Mobile Device 0002 | 506 Mobile Device 0003 |
|---|---|---|---|
| Birthday | October 12, 1964 | April 3, 1972 | January 9, 1966 |
| Anniversary | December 12, 1987 | May 22, 2002 | March 17, 1992 |
| Other Personal Information | Dolphin fan | | Daughter's Birthday May 12th |
| Email String | | "Hope to see you at next Tuesday's meeting" | |
| Text Messages | "Want to Watch the Dolphins game this Sunday?" | | "Be sure you bring the financial reports to the meeting" |
| Meeting Notes | We need to significantly improve our marketing effort to match last years numbers. Talk to Ed about this tomorrow. | | Bob's presentation was excellent. Discuss his possible promotion with Steve at tomorrow's status conference. |

(56) References Cited

OTHER PUBLICATIONS

Nokia 6212 classic delivers tap-to-share NFC technology; http://www.knowyourcell.com/news/353627/nokia_6212_classic_delivers_taptoshare_nfc_technology.html. Published on Nov. 6, 2009 and retrieved on Mar. 5, 2011.

Yang, Guang; Social Proximity Networks on Cruise Ships; http://mirw08.offis.de/paper/15.pdf, 2008.

* cited by examiner

| | Mobile Device 0001 | Mobile Device 0002 | Mobile Device 0003 |
|---|---|---|---|
| Birthday | October 12, 1964 | April 3, 1972 | January 9, 1966 |
| Anniversary | December 12, 1987 | May 22, 2002 | March 17, 1992 |
| Other Personal Information | Dolphin fan | | Daughter's Birthday May 12th |
| Email String | | "Hope to see you at next Tuesday's meeting" | |
| Text Messages | "Want to Watch the Dolphins game this Sunday?" | | "Be sure you bring the financial reports to the meeting" |
| Meeting Notes | We need to significantly improve our marketing effort to match last years numbers. Talk to Ed about this tomorrow. | | Bob's presentation was excellent. Discuss his possible promotion with Steve at tomorrow's status conference. |

FIG. 5

EFFICIENCY OF ELECTRONIC MESSAGE COMMUNICATIONS BETWEEN MOBILE COMMUNICATION DEVICES

FIELD OF THE DISCLOSURE

The disclosure relates generally to mobile communication devices, and more particularly, to improving the efficiency of electronic message communications between mobile communication devices.

BACKGROUND

Electronic communication devices enable a variety of functions including, for example, telephonic functions, electronic messaging functions and other personal information manager application functions. Business associates and friends generally participate in ongoing communication sessions using mobile communication devices. These devices store information corresponding to prior communication sessions.

Existing systems have limited ability to recognize and utilize prior relationships or prior communication sessions occurring between mobile communication devices. Even if a prior communication session is recognized, existing systems fail to push pertinent information, including personal information about the operator of a target mobile communication device, in order to make the information available for use prior to initiating a new communication session. Prior systems therefore do not efficiently utilize stored information that may facilitate and streamline future communication sessions, such as electronic message communication sessions, between operators of mobile communication devices.

BRIEF DESCRIPTION OF THE DRAWINGS

FIG. 5 is an exemplary storage table populated by data entries based on information received from one or more target mobile communication devices according to one example of the disclosure.

DETAILED DESCRIPTION

Figure 1:
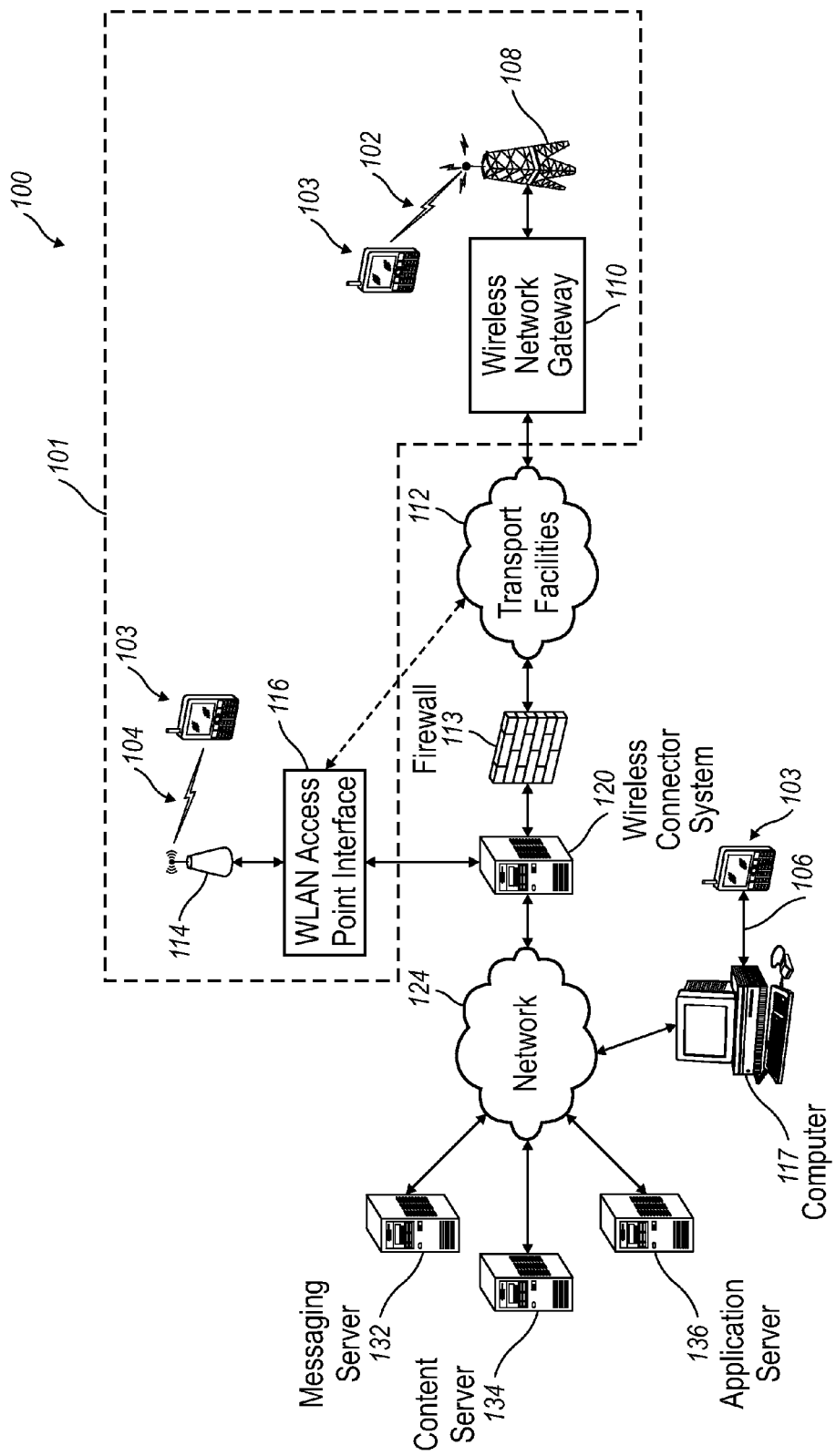
FIG. 1 is a communication system for mobile communication devices according to one example of the disclosure.

According to one example of the disclosure, a first mobile communication device detects a presence of other target mobile communication devices that are located in a predetermined vicinity. The first mobile communication device may monitor location information in order to detect the presence of other mobile communication devices. The location information may include, for example, global positioning information ("GPS"), information related to geographic information systems ("GIS"), or cell tower identification information, or the like. Upon detecting other target mobile communication devices that are located within a predetermined vicinity of the first mobile communication device, information related to the operator of the each target mobile communication device operated within the predetermined vicinity is retrieved in order to use this information in subsequent communications. For example, the subsequent communications comprise future email or text sessions between the two devices. It is desirable to access and store specific information about the operator of a target mobile communication device in order to create a more relevant and meaningful future communication session.

According to one example of the disclosure, a data search hierarchy feature is provided that allows the user of the first mobile communication device to selectively receive information about the operator of the target mobile communication devices based on relevance of the information. For example, in a time-based data search, the user of the first mobile communication device receives all information, such as prior email sessions and text strings, relating to the target mobile communication device that have occurred within a previous time period, i.e., within the past twenty four hours. Thus, the user can receive and view all electronic message sessions that have occurred between the user and the operator of a target mobile communication device within the past twenty four hours. Of course, the time frame can be any time frame, i.e., all communications within the past twelve hours, one week or one month, and the disclosure is not limited in this regard. In this fashion, the first communication device provides a user with relevant communications that is still "fresh" in the user's mind, such that these communications can be used in subsequent electronic mail sessions with the owner of the target device.

In another example of the disclosure, a frequency-based data search is performed. In this instance, the user ranks applications that are available on the mobile communication device, such as a contact list application, an address book application, an email application, a text message application or the like, depending upon their frequency of use, for example. If the user of the first mobile communication device communicates using primarily an electronic mail application, a storage device associated with this application may be searched to retrieve and display prior email sessions occurring with the owner of a target mobile communication device. Information from other applications may be accessed after the electronic email application data presented to the user. The other application information comprises text message session information, contact list information, and address book information, or the like. Alternatively, users may desire to receive relevant information from their address book application or contact list application if these applications are accessed more frequently. In another example, the user may elect to receive information based on a frequency-based data search, if there has been no relevant information retrieved from the time-based data search i.e., if there has been no relevant email communication or text sessions with the owner of a target mobile communication device within the past twenty four hours.

In yet another example, the user may designate a pre-set order that is used to search for relevant information. Thus, for example, the user of the first mobile communication device may wish to view all previous email communications between the first mobile communication device and the target mobile communication device first, followed by any relevant information obtained from the user's address book application (i.e., John Smith, the operator of the target mobile communication device, has a birthday approaching), followed by previous text strings, etc.). Thus, the disclosure allows the user of the mobile communication device to select an order for viewing information based on a preselected hierarchal data retrieval scheme.

FIG. 1 illustrates an example of an operating environment for a communication system 100 that may include a number of mobile communication devices 103. The communication system 100 may be coupled to the mobile communication devices 103 in any of several different ways. The mobile communication devices 103 may be coupled to a wireless network 101, such as one or more of a Wireless Wide Area Network (WWAN) 102 and a Wireless Local Area Network (WLAN) 104, among other suitable network arrangements. In some examples, the mobile communication devices 103 may be configured to communicate over both the WWAN 102 and WLAN 104, and to roam between these networks. In some examples, the wireless network 101 may comprise multiple WWANs 102 and WLANs 104, among other configurations.

The WWAN 102 may be implemented as any suitable wireless access network technology. By way of example, but not limitation, the WWAN 102 may be implemented as a wireless network that includes a number of transceiver base stations 108 (one of which is shown in FIG. 1), where each of the base stations 108 provide wireless Radio Frequency (RF) coverage to a corresponding area or cell. The WWAN 102 typically is operated by a mobile network service provider that provides subscription packages to users of the mobile communication devices 103. In some examples, the WWAN 102 may conform to one or more of the following wireless network types: Mobitex Radio Network; DataTAC; GSM (Global System for Mobile Communication); GPRS (General Packet Radio System); TDMA (Time Division Multiple Access); CDMA (Code Division Multiple Access); CDPD (Cellular Digital Packet Data); iDEN (integrated Digital Enhanced Network); Ev-DO (Evolution-Data Optimized); CDMA2000; EDGE (Enhanced Data rates for GSM Evolution); UMTS (Universal Mobile Telecommunication Systems); HSPDA (High-Speed Downlink Packet Access); IEEE 802.16e (also referred to as Worldwide Interoperability for Microwave Access or "WiMAX"), or various other networks. While WWAN 102 is described herein as a "Wide-Area" network, that term is intended also to incorporate wireless Metropolitan Area Networks (WMAN) or other similar technologies for providing coordinated service wirelessly over an area larger than that covered by typical WLANs.

The WWAN 102 may communicate with a wireless network gateway 110 that couples the mobile communication devices 103 to transport facilities 112. The transport facilities 112 couple the mobile communication devices 103 to a wireless connector system 120. The transport facilities 112 may include one or more private networks or lines, the Internet, a virtual private network, or any other suitable network, among other transport facilities. The wireless connector system 120 may be operated, for example, by an organization or enterprise such as a corporation, university, or governmental department, among other organizations or enterprises, which allow access to a network 124, such as an internal or enterprise network (e.g., an intranet) and its resources. Alternatively, the wireless connector system 120 may be operated by a mobile network provider. In some examples, the network 124 may be realized using the Internet rather than, or in addition to, an internal or enterprise network.

The wireless network gateway 110 provides an interface between the wireless connector system 120 and the WWAN 102. The wireless network gateway 110 facilitates communication between the mobile communication devices 103 and other devices (not shown) that may be connected, directly or indirectly, to the WWAN 102. Accordingly, communications sent via the mobile communication devices 103 are transported via the WWAN 102, the wireless network gateway 110 and the transport facilities 112 to the wireless connector system 120. Communications sent from the wireless connector system 120 are received by the wireless network gateway 110 and transported via the WWAN 102 to the mobile communication devices 103.

According to one example, the WLAN 104 includes a wireless network that conforms to IEEE 802.11x standards (sometimes referred to as WI-FI™) such as, for example, the IEEE 802.11a, 802.11b and/or 802.11g standard. One of ordinary skill in the art will readily appreciate that other communication protocols may be used for the WLAN 104, such as, IEEE 802.11n, IEEE 802.16e (also referred to as Worldwide Interoperability for Microwave Access or "WiMAX"), or IEEE 802.20 (also referred to as Mobile Wireless Broadband Access), among other communication protocols. The WLAN 104 includes one or more wireless RF Access Points (AP) 114 (one of which is shown in FIG. 1) that collectively provide a WLAN coverage area.

The WLAN 104 may be a user's personal network, an enterprise network, or a hotspot offered by an Internet service provider (ISP), a mobile network provider, or a property owner in a public or semi-public area, for example. The access points 114 may be connected to an access point (AP) interface 116 that may connect to the wireless connector system 120 directly or indirectly. A direct connection may be provided when the access point 114 is part of an enterprise WLAN 104 in which the wireless connector system 120 resides. An indirect connection may be provided via the transport facilities 112, as indicated by the dashed signal line in FIG. 1, if the access point 114 is a personal WI-FI network or WI-FI hotspot. In this case, a mechanism, such as a virtual private network (VPN), may be used for securely connecting to the wireless connector system 120. The AP interface 116 may provide translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email, Hypertext Transfer Protocol (HTTP), and HTTP Secure (HTTPS) communications to and from a set of managed mobile communication devices 103. The wireless connector system 120 also provides administrative control and management capabilities over users and mobile communication devices 103 that may connect to the wireless connector system 120.

The wireless connector system 120 allows the mobile communication devices 103 to access the network 124 and connected resources and services such as a messaging server 132, for example, a MICROSOFT EXCHANGE SERVER®, IBM LOTUS DOMINO®, or NOVELL GROUPWISE™ email server; a content server 134 for providing content, such as Internet content or content from an organization's internal servers; application servers 136 for implementing server-based applications, such as instant messaging (IM) applications to mobile communication devices 103, and intranet file services; among other connected resources and services.

The wireless connector system 120 typically provides a secure exchange of data (e.g., email messages, personal information manager (PIM) data, and IM data) with the mobile communication devices 103. In some examples, communications between the wireless connector system 120 and the mobile communication devices 103 may be encrypted. In some examples, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some examples, the private encryption key is stored only in the user's mailbox on the messaging server 132 and on the mobile communication device 103, and can typically be regenerated by the user on mobile communication devices 103. Data sent to the mobile communication devices 103 is encrypted by the wireless connector system 120 using the private encryption key retrieved from the user's mailbox. The encrypted data, when received on the mobile communication devices 103, is decrypted using the private encryption key stored in memory. Similarly, data sent to the wireless connector system 120 from the mobile communication devices 103 is encrypted using the private encryption key stored in the memory of the mobile communication device 103. The encrypted data, when received on the wireless connector system 120, is decrypted using the private encryption key retrieved from the user's mailbox.

The wireless network gateway 110 is adapted to send data packets received from the mobile communication device 103 over the WWAN 102 to the wireless connector system 120. The wireless connector system 120 then sends the data packets to the appropriate connection point such as the messaging server 132 or the content servers 134 or the application server 136, or a combination of these. Conversely, the wireless connector system 120 may send data packets received, for example, from the messaging server 132 or the content servers 134 or the application servers 136 or any combination of these, to the wireless network gateway 110 that then transmit the data packets to the destination mobile communication device 103. The AP interfaces 116 of the WLAN 104 provide similar sending functions between the mobile communication device 103, the wireless connector system 120 and network connection point, such as the messaging server 132, the content server 134, the application server 136, or any combination of these.

The network 124 may comprise a private local area network (LAN), metropolitan area network (MAN), wide area network (WAN), the public Internet or combinations thereof. The network 124 may include virtual networks constructed using any of these networks, alone or in combination. Alternatively, the mobile communication device 103 may connect to the wireless connector system 120 using a computer 117, such as a desktop or a notebook computer, via the network 124. A link 106 may be provided between the mobile communication device 103 and the computer 117 for exchanging information between the mobile communication device 103 and a computer 117 connected to the wireless connector system 120. The link 106 may include one or both of a physical interface or a short-range wireless communication interface.

The physical interface may comprise one or a combination of an Ethernet connection, a Universal Serial Bus (USB) connection, a FIREWIRE™ (also known as an IEEE 1394 interface) connection, or other serial data connections, via respective ports or interfaces of the mobile communication device 103 and computer 117. The short-range wireless communication interface may be a personal area network (PAN) interface. A personal area network is a wireless point-to-point connection implemented without physical cables to connect the two end points. The short-range wireless communication interface may include one or a combination of an infrared (IR) connection, such as an Infrared Data Association (IrDA) connection, a short-range radio frequency (RF) connection, such as one specified by IEEE 802.15.1 or the BLUETOOTH special interest group, or IEEE 802.15.3a, also referred to as UltraWideband (UWB), or other PAN connection.

It will be appreciated that the above-described communication system 100 is provided for illustration purposes only. The above-described communication system 100 may be implemented using any of a multitude of network configurations for use with the mobile communication devices 103. Suitable variations of the communication system 100 will be readily appreciated by a person of ordinary skill in the art and are intended to fall within the scope of the present disclosure.

Figure 2:
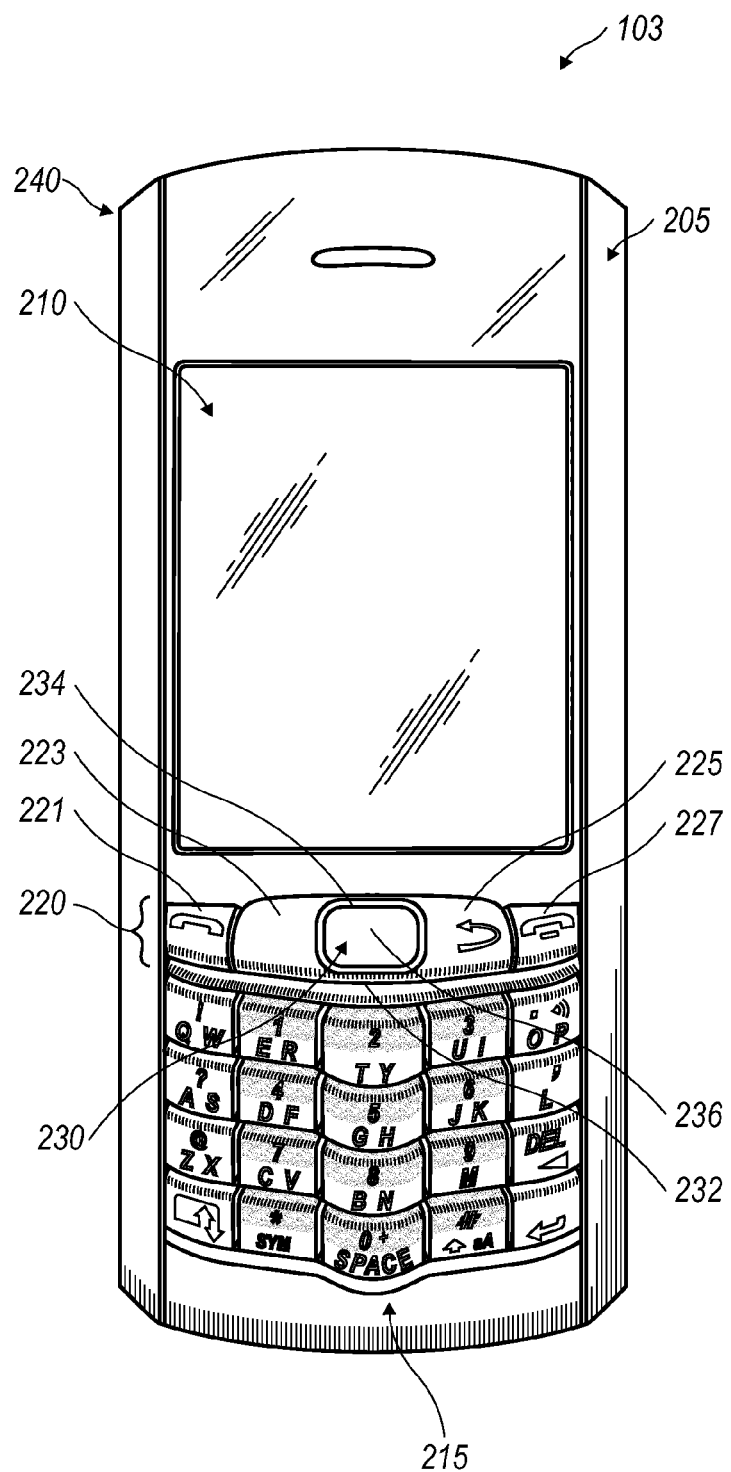
FIG. 2 is a mobile communication device according to one example of the disclosure.

FIG. 2 illustrates a front view of mobile communication device 103 according to one example. While the illustrated example depicts the mobile communication device 103 as a "smart phone", the disclosure supports the mobile communication device 103 being a personal digital assistant (PDA), a laptop computer, a tablet computer, or other mobile communication device capable of sending and receiving communication messages. The mobile communication device 103 may comprise a "unibody" structure, also known to those skilled in the art as a "candy-bar" configuration. In alternate examples, the mobile communication device 100 may include a "clamshell" or a "slider" configuration, or the like.

In the example, the mobile communication device 103 comprises a front face 205 having a display 210 located above an input user interface, such as a keyboard 215. The keyboard 215 comprises a plurality of keys that are actuable to provide data input via tactile pressure. The mobile communication device 103 further comprises a row of programmable keys 220 configured to perform selected functions as is known in the art. For example, programmable keys 220 may include a call send key 221, a menu key 223, an escape key 225 and a call end key 227, and the like.

According to one example, the mobile communication device 103 may include a navigation module 230 that generates signals for navigating content on the display 210. The navigation module 230 may be structured to enable two-dimensional or three-dimensional navigation on the display 210, among enabling other functions. For example, the navigation module 230 may include one or more sensor arrays having capacitive sensors or optical sensors, among other sensor types. The sensor arrays may generate signals for instructing cursor movement in substantially any direction on the display 210.

The navigation module 230 may include a cover 232 that is exteriorly located on the front face 205 of the mobile communication device 103. This location allows the navigation module 230 to be thumb-actuable or finger-actuable, similar to the keys on the keyboard 215 and the programmable keys 220. The cover 232 may include at least one decorative ring 234 that defines a tracking window 236 and outlines a perimeter of the underlying sensor arrays. As a result, users of the mobile communication device 103 receive a visual indication of the sensing area for the navigation module 230.

The cover 232 may be constructed with sufficient flexibility to enable actuation of the navigation module 230 by applying a force thereto. For example, the cover 232 may be constructed to flex in a direction perpendicular to the surface when a depression force is applied thereto. The cover 232 is also constructed with sufficient rigidity to provide support for objects that track along the tracking window 236. The navigation module 230 may be located on the front face 205 of the mobile communication device 103 and may be positioned in an area between the keyboard 215 and the display 210. In this location, the navigation module 230 may avoid interfering with the keyboard 215 during keyboarding. Furthermore, in this location, the navigation module 230 does not block the operator's view of the display 210 during use. One of ordinary skill in the art will readily appreciate that the navigation module 230 may be positioned at other locations on the mobile communication device 103.

The mobile communication device 103 optionally includes a reduced QWERTY keyboard 232. Alternatively, the mobile communication device 103 may include other keyboard configurations, including a full size keyboard or a virtual keyboard provided on a touch screen display (not shown). Each key of the keyboard 215 may be associated with at least one alphabetic character, numeral or command, among other data item. The commands may include a space command or a return command, among other commands. The plurality of the keys may include alphabetic characters and may be arranged in various known layouts, including a QWERTY layout (as shown in FIG. 2), a QZERTY layout, a QWERTZ layout, an AZERTY layout, a Dvorak layout, a Russian keyboard layout, a Chinese keyboard layout, or other known layouts. These known layouts are provided by way of example and other known layouts are considered within the scope of this disclosure. The keyboard layout may be selected based on a desired geographical region of operation. Additionally, the keyboard 215 may be interchangeable such that a user may switch between keyboard layouts.

The mobile communication device 103 may include a body 240 that is sized to facilitate hand-held use. The display 210 may be provided on the front face 205 of the body 240 to enable data display and to facilitate sending and receiving communication through a network, including voice and data messages. The mobile communication device 103 may include peripherals, such as a camera or video recorder to enable recording of digital images.

Figure 3:
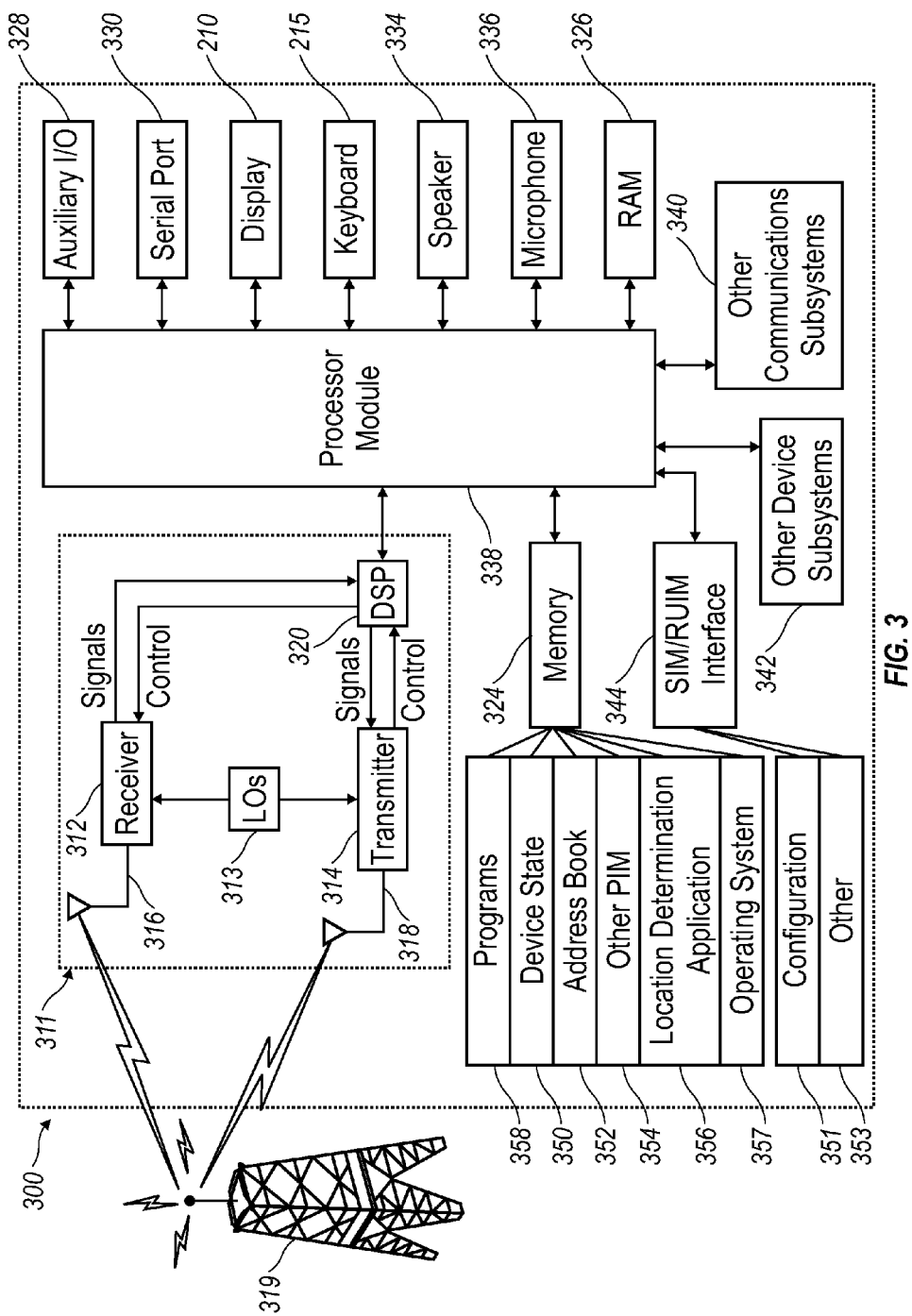
FIG. 3 is a block diagram of the mobile communication device illustrated in FIG. 2, according to one example of the disclosure.

FIG. 3 illustrates a block diagram 300 of the mobile communication device 103 in accordance with an example of the disclosure. The mobile communication device 103 includes a microprocessor 338 that controls operations of the mobile communication device 103. A communication module 311 performs communications, including transmission and reception, with the wireless network 319. The microprocessor 338 may be communicatively coupled to an auxiliary input/output (I/O) subsystem 328 of the mobile communication device 103. In at least one example, the microprocessor 338 may be communicatively coupled to a serial port 330, such as a Universal Serial Bus port, that enables communications with other devices or systems. The user interface or display 210 may be communicatively coupled to the microprocessor 338 for displaying information to an operator of the mobile communication device 103.

When the mobile communication device 103 is equipped with a keyboard 215, the keyboard 215 also may be communicatively coupled with the microprocessor 338. The mobile communication device 103 may include a speaker 334, a microphone 336, a random access memory (RAM) 326, and memory 324, which may be, for example flash memory, among other components. These components may be communicatively coupled to the microprocessor 338. Other components may be provided on the mobile communication device 103 and these other components may be optionally communicatively coupled to the microprocessor 338. Other communication subsystems 340 and other communication device subsystems 342 are generally indicated as being functionally connected with the microprocessor 338 as well. An example of a communication subsystem 340 includes a short range communication system, such as a BLUETOOTH® communication module or a WI-FI™ communication module, such as a communication module in compliance with IEEE 802.11b, and associated circuits and components. Additionally, the microprocessor 338 may be configured to perform operating system functions and enable the execution of programs on the mobile communication device 103. In some examples, less than all of the above components may be included in the mobile communication device 103. For example, in at least one examples, the keyboard 215 is not provided as a separate component and is instead integrated with a touch screen as described below.

The auxiliary I/O subsystem 328 may take the form of a variety of different navigation tools, including multi-directional or single-directional navigation tools. The navigation tools may include a trackball navigation tool, a thumbwheel, a navigation pad, a joystick or a touch-sensitive interface (e.g., a trackpad), among other I/O interfaces. According to one example, the navigation tool may include a trackball navigation module 230, as illustrated in the example shown in FIG. 2. These navigation tools may be located on the front surface of the mobile communication device 103 or may be located on any exterior surface of the mobile communication device 103.

Other auxiliary I/O subsystems may include external display devices and externally connected keyboards (not shown). While the above examples have been provided in relation to the auxiliary I/O subsystem 328, other subsystems capable of providing input or receiving output from the communication device 103 are considered within the scope of this disclosure. Additionally, other keys may be placed along the side of the mobile communication device 103 to function as escape keys, volume control keys, scrolling keys, power switches, or user programmable keys, and may likewise be programmed accordingly.

The keyboard 215 may include a plurality of keys that are physical in nature, such as actuable buttons. Alternatively, the keyboard 215 may be virtual or software in nature, typically constituted by representations of physical keys on the user display 210 (referred to herein as "virtual keys"). It is also contemplated that user input may be provided as a combination of these two types of keys. Each key of the plurality of keys may be associated with at least one action, which can be the input of a character, a command or a function. In this context, "characters" are contemplated to exemplarily include alphabetic letters, language symbols, numbers, punctuation, insignias, icons, pictures, or blank space, among other characters.

In the case of virtual keys, the indicia for the respective keys may be shown on the user interface or display 210. According to one example, the virtual keys may be enabled by touching the display screen 210, for example, with a stylus, finger, or other pointer, to generate the character or activate the indicated command or function. Some examples of display screens 210 capable of detecting a touch include resistive, capacitive, projected capacitive, infrared and surface acoustic wave (SAW) touch screens.

Physical and virtual keys may be combined in many different ways, as appreciated by those skilled in the art. In one example, the physical and virtual keys may be combined, such that the plurality of enabled keys for a particular program or feature of the mobile communication device 103 are shown on the display screen 210 in the same configuration as the physical keys. Using this configuration, the operator can select the appropriate physical key corresponding to what is shown on the display screen 210. Thus, the desired character, command or function is obtained by depressing the physical key corresponding to the character, command or function displayed at a corresponding position on the display screen 210, rather than touching the display screen 210.

Furthermore, the mobile communication device 103 may be equipped with components that enable operation of various programs. According to one example, memory 324 may be provided to store an operating system 357, device programs 358, and data. The operating system 357 is generally configured to manage other programs 358. The programs 358 may be stored in memory 324 and may be executable on the microprocessor 338. The operating system 357 honors requests for services made by the programs 358 through predefined program interfaces, among other request types. More specifically, the operating system 357 typically determines the order in which the multiple programs 358 are executed on the microprocessor 338. The operating system 357 also determines the execution time allotted for each program 358, manages sharing of the memory 324 among the multiple programs, and handles input and output to and from other device subsystems 342, among performing other operations.

Additionally, operators may interact directly with the operating system 357 through a user interface. Interactions may be facilitated by input devices, including the keyboard 215 and the display screen 210. While in one example of the operating system 357 may be stored in memory 324, the operating system 357 in other examples may be stored in a read-only memory (ROM) or similar storage element (not shown). As those skilled in the art will appreciate, the operating system 357, device program 358 or parts thereof may be loaded in a RAM 326 or other volatile memory.

In some examples, memory 324 may include programs 358 for execution on the mobile communication device 103, including an address book 352, a personal information manager (PIM) 354, or a device state 350, among other programs. Furthermore, the programs 358, including data, may be segregated upon storage in memory 324 of the mobile communication device 103. Mobile communication device 103 also includes a location determining application 356, which can detect the presence of one or more other mobile communication devices 103 within a predetermined distance. Location determining application 356 receives location information from one or more target mobile communication devices and, by comparing it to the current location of mobile communication device 103, determines, if one or more target mobile communication devices are within a predetermined distance of mobile communication device 103. In one example, location information can be embedded within a communication, i.e., an email, text message, or picture. In this fashion, mobile communication device 103 can receive electronic messages or photographs that include embedded location information related to the sender of the communication. This allows mobile communication device 103 to determine if other mobile communication devices are in the vicinity.

When the mobile communication device 103 is enabled for two-way communication within the wireless communication network 319, it can send and receive signals from a mobile communication service. Examples of communication systems enabled for two-way communication include, but are not limited to, General Packet Radio Service (GPRS) networks; Universal Mobile Telecommunication Service (UMTS) networks; Enhanced Data for Global Evolution (EDGE) networks; Code Division Multiple Access (CDMA) networks; High-Speed Packet Access (HSPA) networks; Universal Mobile Telecommunication Service Time Division Duplexing (UMTS-TDD) networks; Ultra Mobile Broadband (UMB) networks; Worldwide Interoperability for Microwave Access (WiMAX) networks, or other networks that can be used for combined data and voice capabilities or separate data and voice capabilities. For the communication systems listed above, the mobile communication device 103 may use a unique identifier to enable the mobile communication device 103 to transmit and receive signals from the communication network 319. Other systems may not use such identifying information. For example, GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in multiple different mobile communication devices 103. The mobile communication device 103 may be able to operate some features without a SIM/RUIM card, but it will not be able to communicate with the network 319. A SIM/RUIM interface 344 may be located within the mobile communication device 103 to allow for removal or insertion of a SIM/RUIM card (not shown). The SIM/RUIM card features memory and may hold key configurations 351 and other information 353, such as identification and subscriber-related information. With a properly enabled mobile communication device 103, two-way communication may be performed between the mobile communication device 103, and the communication network 319.

If the mobile communication device 103 is enabled as described above or the communication network 319 does not use such enablement, the two-way communication enabled mobile communication device 103 may be configured to both transmit and receive information from the communication network 319. The communication transfer may be performed to or from the mobile communication device 103. In order to communicate with the communication network 319, the mobile communication device 103 may be equipped with an integral or internal antenna 318 for transmitting signals to the communication network 319. Likewise, the mobile communication device 103 may be equipped with another antenna 316 for receiving communication from the communication network 319. According to one example, these antennas (316, 318) may be combined into a single antenna (not shown). As one skilled in the art would appreciate, the antenna or antennas (316, 318) in another example may be externally mounted on the mobile communication device 103.

When equipped for two-way communication, the mobile communication device 103 may include the communication module 311 that supports the operational needs of the mobile communication device 103. The communication module 311 may include a transmitter 314 and a receiver 312 including an associated antenna or antennas (316, 318) as described above, local oscillators (LOs) 313, and a processing module that in the presently described example is a digital signal processor (DSP) 320.

It is contemplated that communication between the mobile communication device 103 and the wireless network 319 may be any type of communication that both the wireless network 319 and mobile communication device 103 are enabled to support. In general, these communications may be classified as voice and data communications. Voice communication generally refers to communication in which signals for audible sounds are transmitted through the communication network 319 by the mobile communication device 103. Data communication generally refers to all other types of communication that the mobile communication device 103 is capable of performing within the constraints of the wireless network 319.

FIGS. 1, 2 and 3 are examples only and those persons skilled in the art will appreciate that additional elements and modifications may be necessary to make the mobile communication device 103 operate in particular network environments. The illustrated examples disclose the mobile communication devices 103 as smart phones. Alternative examples contemplate that the communication devices 103 may include personal digital assistants (PDA), tablet computers, laptop computers, or other communication devices capable of sending and receiving electronic messages.

When the mobile communication device 103 is located within a pre-defined range of one or more target mobile communication devices, information may be received from the one or more target mobile communication devices via the use of a short range communication protocol. The short range communication protocols may include but are not limited to near field communication ("NFC"), location based services ("LBS"), BLUETOOTH, WI-FI, radio frequency identification ("RFID"), Infrared Data Association ("IrDA"), or the like.

Thus, when the mobile communication device 103 is located within a predetermined distance "d" of a target mobile communication device, near field communication is established between the two devices. Distance "d" can vary and the disclosure is not limited to a particular distance between user mobile communication device 103 and a target mobile communication device before communication is established.

When the mobile communication device 103 is located within the predetermined range of a target mobile communication device, data can be exchanged between the two devices. For example, the exchanged data can include information about the operator associated with each target mobile communication device, such as but not limited to the name, telephone number, and email address of the operator. Personal information such as the birthday or wedding anniversary of each operator, the operators' calendar of upcoming events, and other information stored in the respective address books and contact lists, also can be exchanged. The disclosure is not limited to any specific types of information and may include all types of information including information the operator of user mobile communication device 103 may find useful prior to initiating a future electronic message session with the operator of a target module communication device.

After receiving information from a target mobile communication device, the mobile communication device 103 may store the information at a storage device located within user mobile communication device 103 or at a storage device in communication with the mobile communication device 103. For example, the information may be stored and managed in messaging server 132, content server 134, application server 136 or other servers in communication with mobile communication device 103. The information can be stored, for example, within an electronic phone book, address book, contact list, or table such as the one shown in FIG. 5. Storing the information received from target mobile communication device 103 can occur automatically, i.e., when user mobile communication device 103 comes within near field range "d" of a target mobile communication device, or may occur at a later time.

In addition to information obtained from other mobile communication devices 103 in the manner discussed above, other information related to prior communications between each operator can be stored within a storage device at the mobile communication device 103 or within one or more servers (i.e., messaging server 132, content server 134, and application server 136). This information may include previous text strings and email messages exchanged between the operator of mobile communication device 103 and the target mobile communication devices. These email messages and text strings can be stored and presented to the user. The user can refer to the previous email messages and text strings prior to interacting with the operator of the target mobile communication device and/or the user may incorporate the text strings from prior sessions into a new email message or text string.

Figure 4:
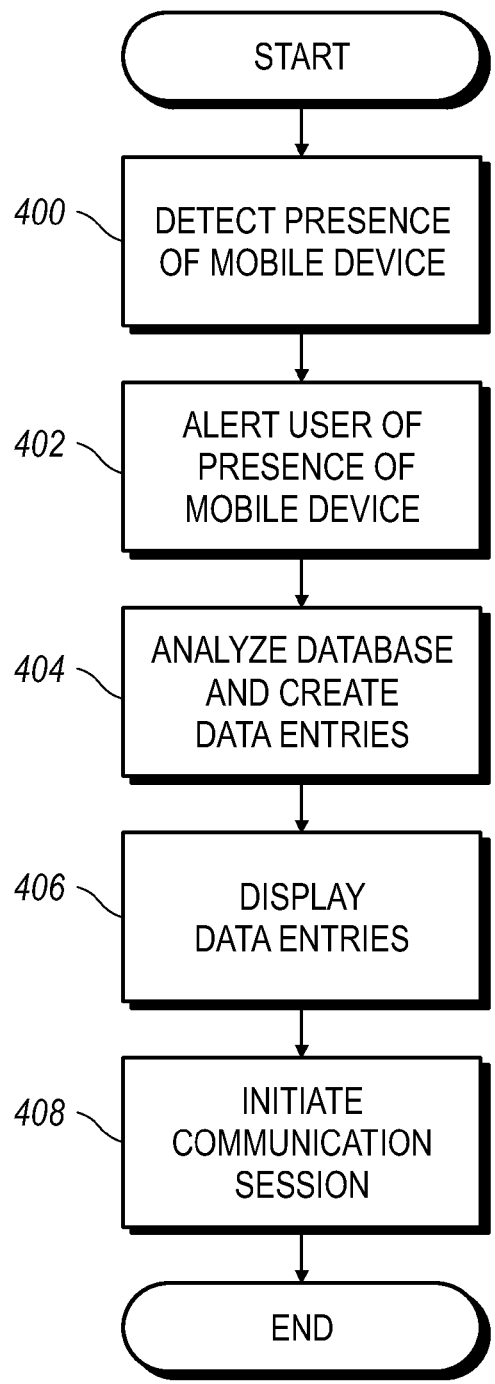
FIG. 4 is a flowchart showing steps that may be performed according to one example of the disclosure.

FIG. 4 is a flowchart illustrating the steps taken after information relating to the operator of other mobile communication devices has already been obtained, either via a short-range communication protocol discussed above or via other methods. The information may be stored either in the mobile communication device 103 or in one or more servers in communication with mobile communication device 103. This information may include personal information about each user, such as a birthday or anniversary, the user's calendar of monthly events, text from recent email or texting sessions, and/or other information that would assist the operator of user mobile communication device 103 in a subsequent conversation, text session, or email communication with the user of target mobile communication device.

At step 400, the mobile communication device 103 detects the presence of one or more target mobile communication devices within a pre-defined area. This detection can be performed in a number of ways. In one example, the mobile communication device 103 receives an electronic message, e.g., a text string or an email message from another mobile communication device, where the electronic message includes location information of the sending mobile communication device embedded within the text string or email message. Alternately, the mobile communication device 103 receives location information embedded in an image, such as a photograph, map, etc., related to the location of the mobile communication device that sent the location information. Processor 338 within mobile communication device 103 determines, from the received location information that another mobile communication device is close to mobile communication device 103. At step 402, a visual, audio, or tactile indication is provided by the mobile communication device 103 to alert the user that another mobile communication device is within a predetermined vicinity or distance.

In another example, a server, such as application server 136 or another server, receives the location information embedded in the electronic message or photograph sent by the sending mobile communication device. Server 136, or another server, then determines that the sending mobile communication device is nearby mobile communication device 103. Server 136 sends an alert to mobile communication device 103, thus alerting the operator of device 103 that another mobile communication device is within the vicinity.

In another example, the user of the mobile communication device 103 submits a list of other mobile communication devices to server 136, or to another server. This list could include those mobile communication devices that the user wants to monitor in case any of those mobile communication devices are within the vicinity of mobile communication device 103. Server 136 or another server can receive location information, e.g., GPS information from each mobile communication device on the list, and when one or more of the listed devices falls within a predetermined range of mobile communication device 103, an alert identifying which device or devices are close by can be sent to device 103.

In certain circumstances, the user of the mobile communication device 103 may choose to disregard rather than act on the alert that it receives alerting of the nearby presence of other mobile communication devices. For example, in an office setting, the user may receive constant and numerous alerts, informing the user that many mobile communication devices are nearby. Therefore, in one example, the user can organize his or her contacts into Tier 1 contacts, Tier 2 contacts, etc., where Tier 1 contacts are more important contacts than Tier 2 contacts, etc. Thus, for example, when the user receives an alert, the alert can also identify whether the nearby mobile communication device is a Tier 1 or Tier 2 contact. In this fashion, the user can efficiently monitor which alerts to accept and which to disregard. In another example, if an alert is repetitively being sent to user mobile communication device, an overwrite feature can be used to suppress this alert. For example, in a meeting, user mobile communication device 103 may receive many alerts due to the proximity of many target devices situated within the meeting location. A setting can be established whereby, for example, after the tenth alert regarding the location of the same mobile communication device, all future alerts are overwritten, and no more alerts about a particular mobile communication device or mobile communication devices are sent to mobile communication device 103 until the overwrite feature is reset.

At step 404, once the user acknowledges the alert, the information previously received from other mobile communication devices and which is stored in a database located either within mobile communication device 103 or on a server, is analyzed, and data entries are created relating to the stored information. The data entries may include, among other things, a previous email message or text string with the target mobile communication device or meeting notes that relates to a topic that will be the subject of the business meeting that the operator of the target mobile communication device is going to attend.

At step 406, the data entries are displayed, in real time, on display 210 of mobile communication device 103. At step 408, the user, via mobile communication device 103, can then initiate a communication session with another mobile communication device, and use the displayed data entries. For example, the data entries may include a previous email message that the operator of user mobile communication device 103 can copy and incorporate into a new email message, thus continuing the email communication with the operator of a target mobile communication device. In yet another example, if the user knows that the operator of a target mobile communication device has an upcoming birthday or anniversary he or she may wish to initiate a new email message or send a text string incorporating an appropriate message or greeting.

In another example, the data entries may be accessed at any time rather than only when another mobile communication device is within a predetermined range. For example, the user of user mobile communication device 103 may have a desire to view the data entries relating to a particular target mobile communication device prior to a business meeting with the user of a target mobile communication device. In this fashion, the user may access the data entries before the target communication device is within range and/or prior to receiving an alert.

In another example, once the presence of a mobile communication device has been detected (step 400), the step of analyzing the database and creating data entries (step 404) and displaying the data entries (step 406) can occur before an alert is sent to the user (step S402). The user can then make the decision whether to accept or suppress the alert after viewing the data entries. In other examples, the display 215 of the mobile communication device 103 is populated with data entries when a mobile communication device is within a predetermined vicinity of mobile communication device 103, without an alert being presented to the user.

FIG. 5 shows an example storage table 500 populated by data entries based on information received from one or more target mobile communication devices. Table 500 can reside in memory 324, or in another storage device within or in communication with device 103. Alternately, table 500 may reside in and be obtained from messaging server 132, content server 134, or other servers that are in communication with mobile communication device 103. In this example, table 500 stores data entries related to information received from or more mobile communication devices. In one example, table 500 stores data entries according to an identification number of each target mobile communication device. For example, data entries pertaining to a target mobile communication device having a mobile communication device identification number of 0001 are stored in column 502, data entries related to a target mobile communication device having a mobile communication device identification number of 0002 are stored in column 504, and data entries related to a target mobile communication device having a mobile communication device identification number of 0003 are stored in column 506. As described above, the data entries can include such items as the birthday, wedding anniversary and other personal information related to the operator of one or more target mobile communication devices, recent email or text strings that previously occurred between user mobile communication device 103 and the target mobile communication devices, the dates and times of previous telephone conversations between the two devices, as well as other information that might prove useful in a business or personal context.

The operator of the communication device 103 can access the data entries stored in table 500 in real time in order to observe and utilize information that may be relevant or useful for future communications with the operator of each target mobile communication device. For example, as the operator of the mobile communication device 103 approaches the operator of a target mobile communication device, which is associated with, for example, mobile communication device identification number 0001, the operator of mobile communication device 103 can access table 500 and, specifically, view the contents of column 502. The data entries in column 502, which are based on information previously obtained, can be utilized in an ensuing email message, text string, telephone conversation or face-to-face discussions. For instance, upon approaching a colleague at the office, the user of mobile communication device 103 can access a previous email string that occurred between the user and the operator of a target mobile communication device. Viewing this email string may jog the user's memory and provide the user with a context upon which to base an ensuing conversation or electronic message session. Alternately, by reviewing the data entries in the fields of table 500, the user may be reminded that the owner of a target mobile communication device has an upcoming birthday or wedding anniversary. Thus, the data entries displayed in table 500 can be retrieved by the user of mobile communication device 103, in real time, and displayed as he or she approaches a colleague or acquaintance and used to ensure relevant and efficient conversations, email or text messaging sessions.

In another example, the data entries retrieved from table 500 and displayed to the user of mobile communication device 103 can be used in a business meeting setting. For example, the operator of user mobile communication device 103 may have attended a previous meeting along with the user of target mobile communication device 0001 and kept notes about events, topics or conversations that took place at the meeting. These notes are stored, along with other information, in column 502 of table 500 under a separate field heading, entitled, for example, "meeting notes". The operator may want to refer to these notes prior to a subsequent meeting that will also be attended by the user of the target mobile communication device in case certain topics are presented again at the subsequent meeting. In this fashion, the operator can better prepare for any conversations, texts or emails initiated by the user of the target mobile communication device regarding topics that may be at the subsequent meeting.

In another example of the disclosure, the mobile communication device 103 may notify a user when another mobile communication device is within a predetermined vicinity. This might occur, for example, when the server in communication with mobile communication device 103 receives location information related a second mobile communication device and a determination is made that the second mobile communication device is within a predetermined distance of the user mobile communication device 103.

The disclosure may be implemented using hardware or software in association with hardware. In some examples, the software may include firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the disclosure may take the form of a computer program product that includes program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Both processors and program code for implementing each as aspect of the disclosure can be centralized or distributed (or a combination thereof) as known to those skilled in the art.

A data processing system suitable for storing a computer program product of the disclosure and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some examples, the data processing system is implemented using one or both of FPGAs and ASICs. The scope of the invention is defined by the appended claims.

We claim:

1. A computer-implemented method of facilitating communications between a user mobile communication device and a target mobile communication device, the method comprising:
   determining whether a location of the target mobile communication device is within a predetermined range;
   creating data entries associated with information corresponding to the target mobile communication device, the data entries including a first email message content exchanged between the user mobile communication device and the target mobile communication device; and
   generating, in response to determining that the location of the target mobile communication device is within the predetermined range, a second email message content to send to the target mobile communication device, the second email message content incorporating the first email message content.

2. The computer-implemented method of claim 1, wherein the predetermined range includes a predetermined area and the data entries include personal information associated with the target mobile communication device.

3. The computer-implemented method of claim 2, wherein the predetermined range includes a predetermined distance from the user mobile communication device and the personal information includes at least one of email content, text message content, a phone call list, a birthday, and meeting notes.

4. The computer-implemented method of claim 1, further comprising alerting the user mobile communication device when it is determined that the target mobile communication device is present within the predetermined range.

5. The computer-implemented method of claim 1, wherein receiving information corresponding to the target mobile communication device occurs via a near field communication protocol.

6. The computer-implemented method of claim 1, wherein determining whether the location of the target mobile communication device is within the predetermined range from the user mobile communication device comprises:
   obtaining location information from the target mobile communication device; and
   comparing a current location of the user mobile communication device with the location information of the target mobile communication device.

7. The computer-implemented method of claim 1, wherein the location information is embedded in an electronic message transmitted from the target mobile communication device to the user mobile communication device.

8. A non-transitory computer readable medium comprising computer instructions which, upon execution by a processor of a mobile communication device, cause the processor to:
   determine whether the location of a target mobile communication device is within a predetermined range;
   create data entries associated with information corresponding to the target mobile communication device, the data entries including a first email message content exchanged between the mobile communication device and the target mobile communication device; and
   generate, in response to determining that the location of the target mobile communication device is within the predetermined range, a second email message content to send to the target mobile communication device, the second email message content incorporating the first email message content.

9. The non-transitory computer readable medium of claim 8, wherein the predetermined range includes a predetermined area and the data entries include personal information associated with the target mobile communication device.

10. The non-transitory computer readable medium of claim 9, wherein the predetermined range includes a predetermined distance from the mobile communication device and the personal information includes at least one of email content, text message content, a phone call list, a birthday, and meeting notes.

11. The non-transitory computer readable medium of claim 8, having computer instructions that cause the processor to further notify the mobile communication device when the target mobile communication device is within the predetermined range.

12. The non-transitory computer readable medium of claim 8, wherein the information is obtained from the target mobile communication device via a near field communication protocol.

13. The non-transitory computer readable medium of claim 8, wherein determining whether the location of the target mobile communication device is within the predetermined range comprises:
   obtaining location information from the target mobile communication device; and
   comparing a current location of the mobile communication device with the location information of the target mobile communication device.

14. The non-transitory computer readable medium of claim 13, wherein the location information is embedded in an electronic message transmitted from the target mobile communication device to the mobile communication device.

15. A communication device, comprising:
   a storage device adapted to store the information;
   a processor that communicates with the storage device having instructions stored thereon that, when executed by the processor, cause the processor to:
      determine whether a location of a target communication device is within a predetermined range;
      create data entries associated with information corresponding to the target communication device, the data entries including a first email message content exchanged between the communication device and the target communication device; and
      generate, in response to determining that the location of the target mobile communication device is within the predetermined range, a second email message content to send to the target communication device, the second email message content incorporating the first email message content.

16. The communication device of claim 15, wherein the predetermined range includes a predetermined area and the data entries include personal information associated with the target communication device.

17. The communication device of claim 16, wherein the predetermined range includes a predetermined distance from the communication device and the personal information includes at least one of email content, text message content, a phone call list, a birthday, and meeting notes.

18. The communication device of claim 15, wherein the information received from the target communication device is obtained via a near field communication protocol.

19. The communication device of claim 15, wherein the processor executes further instructions stored thereon to determine whether the location of the target communication device is within the predetermined range, the further instructions when executed by the processor, cause the processor to:
   obtain location information from the target communication device; and
   compare a current location of the communication device with the location information of the target communication device.

20. The communication device of claim 15, wherein the location information is embedded in an electronic message transmitted from the target communication device to the communication device.

* * * * *